United States Patent

[11] 3,572,677

| [72] | Inventor | James J. Damon |
| | | Dearborn, Mich. |
| [21] | Appl. No. | 782,949 |
| [22] | Filed | Dec. 11, 1968 |
| [45] | Patented | Mar. 30, 1971 |
| [73] | Assignee | Ford Motor Company |
| | | Dearborn, Mich. |

[54] RESILIENT BUSHING
9 Claims, 8 Drawing Figs.

| [52] | U.S. Cl. | 267/57.1 |
| [51] | Int. Cl. | F16f 1/38 |
| [50] | Field of Search | 267/57.1, 57.1 (A) |

[56] References Cited
UNITED STATES PATENTS
2,715,022   8/1955   Krotz .......................... 267/57.1

*Primary Examiner*—James B. Marbert
*Attorneys*—John R. Faulkner and Clifford L. Sadler

ABSTRACT: A resilient pivot device which, in its presently preferred embodiment, is constructed to pivotally connect a vehicle suspension member to a vehicle body. The pivot device includes a resilient body that presents greater resistance to linear movement of the suspension member in one direction than to linear displacement in the opposite direction. When used in a vehicle suspension system, the unequal resiliency prevents a resonant condition from developing that might cause vehicle body shake.

Patented March 30, 1971

3,572,677

INVENTOR.
JAMES J. DAMON
BY John R. Faulkner
Clifford L. Sadler
ATTORNEYS 3,572,677

RESILIENT BUSHING

BACKGROUND OF THE INVENTION

In motor vehicle suspension systems, it is common practice to provide a resilient bushing for pivotally connecting a suspension link or similar element to a vehicle body. Commonly, these bushings have inner and outer concentric cylindrical members with a cylindrical rubber body between the members. In a conventional installation, the outer member is connected to a suspension link and the inner member is connected to a bracket secured to the vehicle body. This construction permits the suspension link to pivot with respect to the body and the rubber isolates vibrations occurring at the wheels from being transmitted to the body. The resilient body also accommodates slight misalignment between the parts resulting from manufacturing tolerances.

While the resilient body effectively isolates road noises, its very resiliency contributes to an undesirable condition known as shake. When a wheel travels over a road having a particular irregularity, a resonant condition can develop in which the suspension arm will vibrate or resonate in a fore or aft direction as the result of the resiliency of the pivot bushing. This fore-and-aft oscillation of the suspension arm causes objectionable body shake.

BRIEF SUMMARY OF THE DISCLOSURE

In view of the start of the art, it is the principal object of the present invention to provide a resilient bushing for connecting a suspension member to a vehicle body which prevents a resonant condition from developing and causing the member to oscillate in a fore-and-aft direction.

In the presently preferred embodiment of this invention, a resilient bushing has inner and outer cylindrical elements with a resilient mass such as rubber interposed between the elements. The inner element is radially offset from the axis of the outer element whereby a greater portion of the resilient mass is situated to one side of the cylindrical inner element. This construction provides greater resiliency to radial displacement of the inner element when it is moved in the direction to compress the thicker portion of the resilient mass than when it moves in the opposite direction. The end result is that the suspension member, which is connected to the inner cylindrical element, encounters greater resiliency when moved linearly in one direction than in the other direction. The unequal resilient resistance to linear movement of the suspension member prevents the creation of a resonant condition and prevents objectionable vibrations from being induced into the vehicle body.

BRIEF DESCRIPTION OF THE DRAWINGS

The many objects and advantages of the present invention will become apparent upon consideration of the following detailed description and the accompanying drawings, in which.

DETAILED DESCRIPTION OF THE PREFERRED EMBODIMENTS

Figure 1:
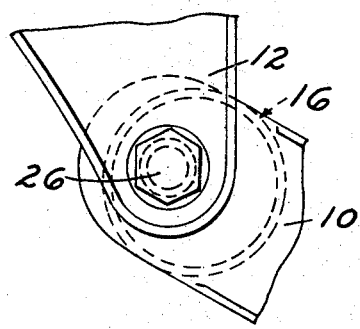
FIG. 1 is a side elevational view of a suspension arm connected to a vehicle body bracket by a resilient rubber bushing constructed in accordance with this invention.
Figure 2:
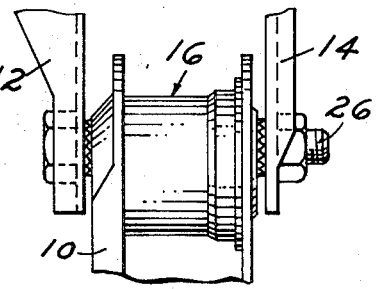
FIG. 2 is an elevational view of the bushing, suspension arm and frame bracket of FIG. 1.

Referring to the drawing for a more complete understanding of the present invention, FIGS. 1 and 2 disclose a suspension arm 10 that is connected to frame brackets 12 and 14 of a motor vehicle by means of a resilient bushing 16. The bushing 16 is constructed in accordance with the teachings of this invention.

The bushing 16 includes an inner tubular assembly 17 having a tubular member 18 that is surrounded by a second tubular member 20. The inner tubular members 18 and 20 are combined in a press fit to form the tubular assembly 17. A resilient rubber body 24 surrounds the tubular assembly 17 and it, in turn, is surrounded by a generally cylindrically outer member 22.

The tubular assembly 17 and the outer member 22 provide a means for assembling the bushing 16 into its proper position. A bolt 26 passes through the center of the tube assembly 17 and provides a means for connecting it to the frame brackets 12 and 14. The ends of the tube 20 are serrated to hold it in position. The suspension arm 10 is provided with a large eye and the outer cylindrical housing 22 of the bushing 16 is press fitted into that eye. Thus, the bushing 16 provides a pivotal connection between the arm 10 and the vehicle body having the brackets 12, 14.

As seen in FIGS. 3, 4, 5 and 6, the inner tubular assembly 17 is radially spaced or offset from the axis of the outer cylindrical part 22. Portion 28 of the resilient member 24 situated between tubes 18, 20 and the outer member 22 is of substantially greater mass than the portion 30 situated on the opposite side of the tube assembly 17. The thicker portion 28 is situated rearwardly of the centerline of the tubes 18, 20 and the thinner mass 30 is situated forwardly when these parts are installed in the vehicle as seen in FIG. 1. Thus, when the suspension arm 10 is loaded in tension, the thinner rubber part 30 is loaded in compression. Contrastly, when the arm 10 is loaded in compression, the thicker portion 28 is loaded in compression.

Figure 3:
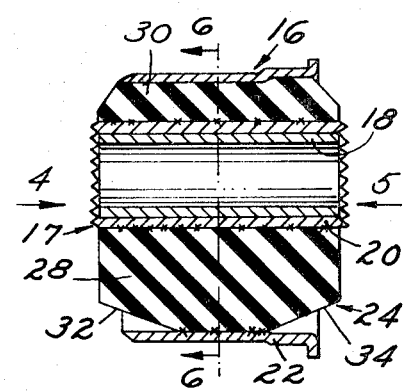
FIG. 3 is a sectional view of the rubber bushing of FIG. 2.

The rubber or other elastomeric material making up the resilient body 24 is of homogeneous consistency and, therefor, of constant unit spring rate. However, because the rubber portions 28 and 30 are of substantially different thicknesses, the effective spring rate for fore-and-aft movement of the arm 10 differs greatly. As seen in FIG. 3, movement of the tube assembly 17 downwardly would meet with a resilient resistance having a lower spring rate than upward movement.

Figure 5:
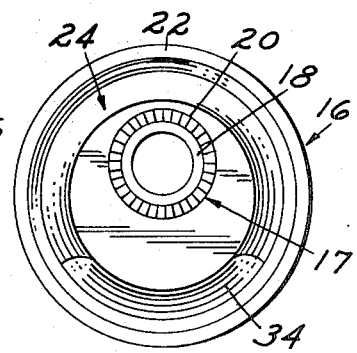
FIG. 5 is an end view of the bushing of FIG. 3 taken in the direction of arrow 5 of that FIG.
Figure 4:
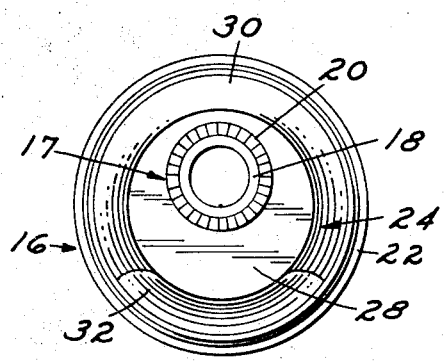
FIG. 4 is an end view of the bushing taken in the direction of arrow 4 of FIG. 3.

Further construction features are present in the bushing which accentuate the difference in effective spring rate between fore-and-aft movement of the arm 10 of FIG. 1. The portion 28 of the rubber body 24 is formed with beveled edges 32 and 34 as seen in FIGS. 3, 4 and 5. Adjacent to the arcuate relieved sections 32 and 34, therefore, a substantially smaller surface area of the rubber body 24 is in contact within the interior of the cylinder 22. As will be observed in FIG. 3, the thinner portion 30 of the rubber body 24 engages the cylinder 22 for its full width whereas only a small center section of the rubber body portion 28 engages the cylinder 22, the beveled surfaces 32 and 34 being spaced from the cylinder. This construction increases the effective radial resiliency of the portion 28.

Thus, when the tube assembly 17 is moved downwardly in FIG. 3, the rubber portion 28 is loaded in compression with accompanying low spring rate elastic deformation until the surfaces 32 and 34 come into contact with the interior of the cylinder 22. By contrast, when the tube assembly 17 moves upwardly, the rubber portion 30 is loaded solely in compression except for the small portions which tend to flow outwardly beyond the edges of the tube 20. Because the arcuate surfaces 32 and 34 are undercut or relieved, the portion 28 of the rubber body 24 has greater effective resiliency, that is, a lower spring rate.

Figure 6:
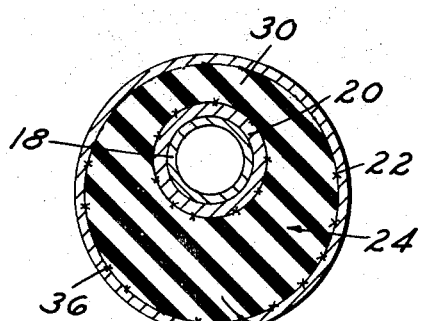
FIG. 6 is a sectional view taken along section line 6—6 of FIG. 3.

To further enhance the directional qualities of the resiliency of the bushing 16, the exterior surface of the rubber portion 28 is bonded at 36 to the interior of the cylinder 22. The bonding of the exterior surface of the portion 28 extends slightly more than 180° along the surface of the rubber mass 24. The surface of the thinner rubber portion 30 is not cemented or bonded to the interior of the cylinder 22. As seen in FIG. 6, the lines dividing the unbonded surface of portion 30 from the bonded surface 36 of portion 28 are in general alignment with the axis of the tube assembly 17. The entire exterior surface of the inner cylindrical tube 20 is bonded to the rubber 24.

With this construction, when the tubes 18, 20 move downwardly as seen in FIG. 6 the portion 28 will be loaded in compression. The portion 30 will not be stressed, instead it will pull away from the interior surface of the cylinder 22. By way of contrast, when the tubes 18, 20 move upwardly, the portion 30 will be loaded in compression and the portion 28 (being cemented along the surface 36) will be loaded in tension. This selective bonding of the surface of the rubber 24 increases the effective spring rate for movements of the tubes 18, 20 that compresses portion 30.

OPERATION

When the bushing 16 is installed in a vehicle to connect the suspension arm 10 with the vehicle body brackets 12 and 14, the bushing 16 will exhibit different spring rates for forward and rearward movement of the arm 16. In one particular application, the effective spring rate for forward arm movement, wherein the larger rubber mass 28 was compressed, was 2,000 pounds per inch of displacement. For rearward movement where the arm 10 was loaded in tension and the thin rubber mass 30 was loaded in compression, the rate was 8,000 pounds per inch. Thus, it is apparent that a resilient bushing constructed in accordance with this invention may have a difference in effective spring rates in a ratio of 4 to 1 for forward and rearward movement of the arm 10. Because the rates are different, fore-and-aft movement of the arm is independent in each direction and a resonant condition cannot develop.

ALTERNATE CONSTRUCTION

Figure 7:
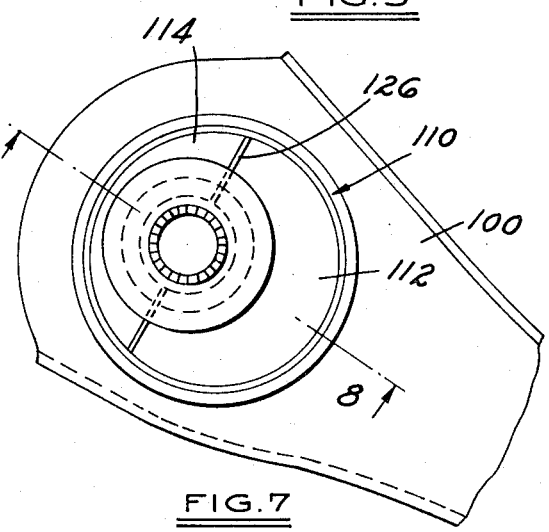
FIG. 7 is an elevational view showing a suspension arm and bushing constructed in accordance with an alternate embodiment of the present invention.
Figure 8:
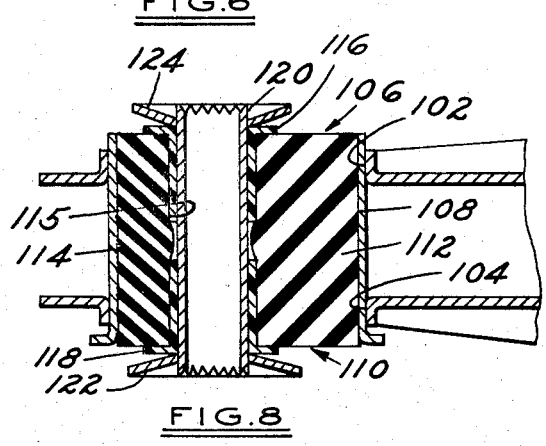
FIG. 8 is a sectional view of the bushing and suspension arm of FIG. 7 taken along section line 8—8 of that FIG.

FIGS. 7 and 8 disclose an alternate form of the present invention. A suspension arm 100 is provided with aligned mounting eyes 102 and 104 into which a resilient bushing assembly 106 is fitted. The bushing assembly includes an outer cylindrical member 108 that is pressed with an interference fit into the opening of the eyes 102, 104. A cylinder 108 surrounds a two-piece rubber assembly 110. The rubber assembly 110 includes a larger rubber piece 112 and a smaller rubber piece 114. The pieces 112 and 114 are positioned together to form a cylindrical exterior surface that fits within the cylindrical piece 108, An axial hole is formed in the rubber assembly 110 at the mating line of the pieces 112 and 114. A pair of hat-shaped bushings 116 and 118 are fitted into the hole 115 in the rubber assembly 110. The bushings 116 and 118 are formed of plastic material and have flange portions that are seated on the side surfaces of the rubber pieces 112 and 114. A metal tube 120 is positioned within the hat-shaped bushings 116 and 118. The ends of the tube 120 are serrated in a manner similar to the serrations at the ends of the tube 20 of bushings 16. Washers 122 and 124 are positioned adjacent to the hat-shaped bushings 116, 118 and over the protruding ends of the tube 120. The tube 120 is designed to receive a pivot bolt that passes through the depending parts of a frame bracket.

Means are provided in the rubber bushing of FIGS. 7 and 8 to produce a different effective spring rate for fore-and-aft movement of the suspension arm 100. For this purpose, it is noted that the axis of the tube 120 is spaced from the axis of the outer tube 108 whereby the rubber piece 112 is of substantially greater thickness than the rubber piece 114. In addition, piece 112 is formed of softer material and in one particular embodiment was formed of rubber having a durometer rating of 50 whereas the piece 114 has a durometer rating of 75. As noted in FIG. 7, adjacent edges of the pieces 112 and 114 are slightly spaced apart as indicated by reference numeral 126. The rubber pieces 114 and 112 may be retained within the cylinder 108 by preloading them in compression or they may be bonded to the cylinder 108. In order to maintain the gap 126, bonding is the preferred method.

Due to the presence of the hat-shaped bushings 116 and 118, the tube 120 rotates with respect to the remainder of the bushing assembly. This construction differs from the prior embodiment wherein the tube 17 is bonded in position. When arm 10 pivoted about the axis of bolt 26 in FIG. 1, the rubber mass 24 within bushing 16 would be loaded in torsion. In the embodiment of FIGS. 7 and 8, pivotal movement of the arm 100 will not cause a torsional loading of the rubber assembly 110.

In the bushing assembly of FIGS. 7 and 8, when the arm 10 moves to the right, rubber piece 114 will be loaded in compression and when the arm moves to the left, rubber piece 112 will be loaded in compression. The effect spring rate for the compression loading of piece 114 will be substantially greater than that for piece 112. The difference results from the fact that piece 114 is substantially thinner than piece 112 and, in addition, is molded from a harder rubber. The bushing assembly of FIGS. 7 and 8 when installed in a suspension system performs in a manner similar to the bushing 16. It prevents the buildup of objectionable resonance or oscillatory movement because displacement of the arm 100 in a first direction encounters a substantially different effective spring rate than movement of that arm in an opposite direction.

The foregoing description presents the presently preferred embodiments of this invention. MOdifications and alterations may occur to those skilled in the art which will come within the scope and spirit of the invention.

I claim:

1. A resilient pivot device for pivotally connecting first and second members comprising a resilient means, a first element constructed to be connected to one of said members, said first element supporting said resilient means, a second element constructed to be connected to the other of said members, said second element engaging said resilient means, said resilient means having a first portion compressed when said one member moves linearly in a first direction with respect to said other member, said resilient means having a second portion compressed when said one member moves in an opposite linear direction, said first portion having greater effective resiliency than said second portion, said second portion being formed of material having a higher unit spring rate than said first portion.

2. The resilient pivot device according to claim 1 and including said resilient means comprising an elastomeric material, said first portion being of greater mass than said second portion.

3. A resilient pivot device for pivotally connecting first and second members comprising an elastomeric means, a first cylindrical element constructed to be connected to said first member, said first element surround said elastomeric means, a second element constructed to be connected to said second member, said second element being positioned within first element and having its exterior surface in engagement with said elastomeric means, said elastomeric means having a first portion that is loaded in compression when said first member moves linearly in a first direction with respect to said second member, said elastomeric means having a second portion that is loaded in compression when said first member moves in an opposite linear direction, said device having a lower effective spring rate when said first member moves in said first direction than when said first member moves in said second direction, said second portion being formed of a material having a higher unit spring rate than said first portion.

4. A resilient pivot device for pivotally connecting first and second members comprising an elastomeric means, a first cylindrical element constructed to be connected to said first member, said first element surround said elastomeric means, a second element constructed to be connected to said second member, said second element being positioned within first element and having its exterior surface in engagement with said elastomeric means, said elastomeric means having a first portion that is loaded in compression when said first member moves linearly in a first direction with respect to said second member, said elastomeric means having a second portion that is loaded in compression when said first member moves in an opposite linear direction, said device having a lower effective spring rate when said first member moves in said first direction than when said first member moves in said second direction, said first portion being bonded to said first element, said second portion being unbonded to said first element.

5. A resilient pivot device for pivotally connecting first and second members comprising an elastomeric means, a first cylindrical element constructed to be connected to said first member, said first element surround said elastomeric means, a second element constructed to be connected to said second member, said second element being positioned within first element and having its exterior surface in engagement with said elastomeric means, said elastomeric means having a first portion that is loaded in compression when said first member moves linearly in a first direction with respect to said second member, said elastomeric means having a second portion that is loaded in compression when said first member moves in an opposite linear direction, said device having a lower effective spring rate when said first member moves in said first direction than when said first member moves in said second direction, portions of the inner surface of said first element overlapping and normally being spaced apart from the adjacent surface of said first portion of said elastomeric means, said just mentioned adjacent surface engaging said inner surface of said first element when said first member moves in said first direction a preset distance.

6. A resilient pivot device for pivotally connecting first and second members comprising an elastomeric means, a first cylindrical element constructed to be connected to said first member, said first element surround said elastomeric means, a second element constructed to be connected to said second member, said second element being positioned within first element and having its exterior surface in engagement with said elastomeric means, said elastomeric means having a first portion that is loaded in compression when said first member moves linearly in a first direction with respect to said second member, said elastomeric means having a second portion that is loaded in compression when said first member moves in an opposite linear direction, said device having a lower effective spring rate when said first member moves in said first direction than when said first member moves in said second direction, the axis of said second element being offset from the axis of said first element, said first portion being bonded to said first element, said second portion being unbonded to said first element.

7. A resilient pivot device for pivotally connecting first and second members comprising an elastomeric means, a first cylindrical element constructed to be connected to said first member, said first element surround said elastomeric means, a second element constructed to be connected to said second member, said second element being positioned within first element and having its exterior surface in engagement with said elastomeric means, said elastomeric means having a first portion that is loaded in compression when said first member moves linearly in a first direction with respect to said second member, said elastomeric means having a second portion that is loaded in compression when said first member moves in an opposite linear direction, said device having a lower effective spring rate when said first member moves in said first direction than when said first member moves in said second direction, said first portion and said second portion having juxtaposed surfaces, substantial portions of said juxtaposed surfaces being spaced apart when said first member moves in said first direction a preset amount.

8. The resilient pivot device according to claim 7 and including the axis of said second element being offset from the axis of said first element.

9. The resilient pivot device according to claim 8 and including said second portion being formed of a material having a higher unit spring rate than said first portion.